(12) United States Patent
Giorgianni et al.

(10) Patent No.: US 6,424,740 B1
(45) Date of Patent: Jul. 23, 2002

(54) METHOD AND MEANS FOR PRODUCING HIGH QUALITY DIGITAL REFLECTION PRINTS FROM TRANSPARENCY IMAGES

(75) Inventors: Edward J. Giorgianni; Fred R. Koeng, both of Rochester, NY (US); Jennifer C. Loveridge, North Harrow (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/354,546

(22) Filed: Jul. 15, 1999

(51) Int. Cl.[7] ................................................. G06K 9/00
(52) U.S. Cl. ...................... 382/167; 358/518
(58) Field of Search ................................ 382/167, 162; 358/518, 519, 520, 532, 506

(56) References Cited

U.S. PATENT DOCUMENTS

| | | | |
|---|---|---|---|
| 4,500,919 A | 2/1985 | Schreiber | 358/78 |
| 4,979,032 A | 12/1990 | Alessi et al. | 358/76 |
| 5,053,866 A | 10/1991 | Johnson | 358/75 |
| 5,267,030 A | 11/1993 | Giorgianni et al. | 358/527 |
| 5,300,381 A | 4/1994 | Buhr et al. | 430/30 |
| 5,528,339 A * | 6/1996 | Buhr et al. | 355/32 |
| 5,579,132 A | 11/1996 | Takahashi et al. | 358/527 |
| 5,608,542 A | 3/1997 | Krahe et al. | 358/449 |
| 5,881,209 A * | 3/1999 | Stokes | 395/109 |
| 6,101,272 A * | 8/2000 | Noguchi | 382/167 |
| 6,198,843 B1 * | 3/2001 | Nakauchi et al. | 382/167 |

* cited by examiner

*Primary Examiner*—Yon J. Couso
(74) *Attorney, Agent, or Firm*—William F. Noval

(57) ABSTRACT

A method of digital photofinishing comprising the steps of: producing a digital color image having colorimetric tristimulus values describing a color transparency media from a color image captured on color transparency photographic media; first transforming the digital color image having colorimetric tristimulus values describing color transparency media to a digital color image having colorimetric tristimulus values describing a reflection print; second transforming the digital color image having colorimetric tristimulus values describing a reflection print into digital code values representative of the color image for printing by a digital color printer using a combination of 1D and 3D look up tables; sharpening the transformed digital code values representative of the color image with a sharpening algorithm optimized to avoid unacceptable artifacts; and digitally printing the sharpened digital color image onto reflection media.

7 Claims, 2 Drawing Sheets

METHOD AND MEANS FOR PRODUCING HIGH QUALITY DIGITAL REFLECTION PRINTS FROM TRANSPARENCY IMAGES

FIELD OF THE INVENTION

This invention relates in general to a digital photofinishing system and more particularly to a digital photofinishing and printing system for making color reflection prints from color transparency film images.

BACKGROUND OF THE INVENTION

Several problem areas need to be addressed when making color negative paper prints from color images on transparent media, such as film images. The object of the process is to make a pleasing reflection print from the transparent film image. The first problem is that color transparency slide images cannot be printed directly onto color negative paper. First, a color negative film intermediate image must be prepared, followed by a printing step onto color negative paper. Another alternative is to print onto special color transparency paper. These alternatives are either multi-step processes requiring considerable time to complete, or are poor in image quality because of unwanted color absorptions in the multiple sets of image dyes. Furthermore, neither process can be fully automated without considerable effort. Even if the latter processes could be automated, no options exist to correct for an inappropriate tone scale reproduction for a particular scene, or for poor sharpness in the final image, that is, there is only one film or paper option for printing all slide materials. It would be desirable to have a digital photo-processing and printing system that enables correction algorithms for the problems mentioned above.

Methods and systems have been described that are devoted to producing pictorial images on various media and devices from scenes captured on photographic film, via scanning, to produce a digital image, image processing, and output rendering. One such system captures scenes on film, scans film to produce a digital image, digitally processes the image, and produces via a laser printer a print on AgX paper. Schreiber (U.S. Pat. No. 4,500,919) discloses an image reproduction system that scans an image captured on film, displays the image on a video monitor, enables image processing, and produces output as an inked hardcopy. U.S. Pat. No. 4,979,032, Alessi et al., describes an apparatus, including a film scanner, a video monitor, an image processor, and an output device, to produce an image on an output medium visually matched to the image displayed on the monitor. U.S. Pat. No. 5,267,030, Giorgianni et al., describes a method and means to transform images captured on film, via digitization on a film scanner, to a color metric or other space, with an output onto a variety of media and devices. Buhr et al (U.S. Pat. No. 5,300,381) describes a pictorial imaging system that includes image capture on photographic film, film scanning to produce a digital image, image processing, and digital output. U.S. Pat. No. 5,579,132, Takahashi, describes an image processing system devoted to storing or producing images that have "substantially the same color" or additional "aesthetic color correction" versus the original scene, based on a variety of image processing transformations of the digitized image. U.S. Pat. No. 5,608,542, Krahe et al., describes a system that produces index prints based on scanning a film frame, image processing, and rendering. Giorgianni et al., in Digital Color Management Encoding Solutions, describes the process for converting from colorimetric tristimulus values for transparency viewing to similar values for reflection media viewing. A printer calibration process is described in U.S. Pat. No. 5,053,866, S. Johnson et al.

All of these articles or patents describe, in one form or another, processes for obtaining more pleasing prints from a film image capture other than from the conventional optical process.

SUMMARY OF THE INVENTION

According to the present invention, there is provided a solution to known reflection media rendering problems inherent to conventional optical or hybrid printing of transparent image media.

According to a feature of the present invention, there is provided a method of digital print preparation comprising the steps of: producing a digital color image having colorimetric tristimulus values describing a color transparency media from a color image captured on color transparency photographic media; first transforming the digital color image having colorimetric tristimulus values describing color transparency media to a digital color image having colorimetric tristimulus values describing a reflection print; second transforming the digital color image having colorimetric tristimulus values describing a reflection print into digital code values representative of the color image for printing by a digital color printer using a combination of 1D and 3D look up tables; sharpening the transformed digital code values representative of the color image with a sharpening algorithm optimized to avoid unacceptable artifacts; and digitally printing the sharpened digital color image onto reflection media.

ADVANTAGEOUS EFFECT OF THE INVENTION

The invention has the following advantages.
1. A pleasing reflection print is made from a color transparency film image.
2. Inappropriate reproduced tone scale and poor sharpness can be corrected for in a digital photofinishing operation.

DETAILED DESCRIPTION OF THE INVENTION

Figure 1:
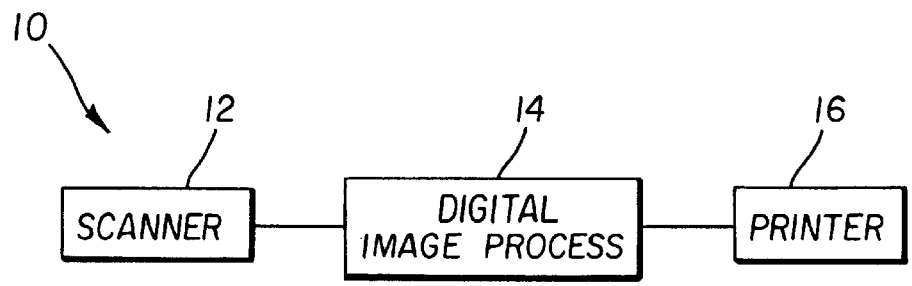
FIG. 1 is a block diagram of a digital photofinishing system incorporating the present invention.

A basic digital system consists of scanning, computer-based image processing, and printing. The following discussion outlines each of these steps, or processes, and the steps in a digital image processing chain that will lead to high quality images, for example photographic reflection prints, from transparent materials. FIG. 1 shows digital imaging system 10, including a scanner 12 to digitize a color transparency film image, a digital image process system 14 that manipulates the digitized film image, and a digital printer 16 that renders the film image as a reflection print. The digital image processing system 14 is preferably a digital computer having user input and computer readable storage media, such as, magnetic, optical, solid state electronic storage devices or other physical device or medium to store a computer program. The digital image processing techniques described below can be stored on computer readable storage media. Alternatively, some or all of the techniques may be incorporated into programmable gate arrays or other hard electronic devices. Digital printer 16 can be a laser or CRT printer, ink jet printer, thermal printer, electrophotographic printer, etc. and the reflection media is media optimized for the print technology used.

Scanner

The scanner for the production of high quality digital prints must scan a full-frame image at a resolution of sufficient density to produce images for printing at a minimum of 250 dpi without interpolation. For example, image scans of at least 1000×1500 pixels are required to produce high quality 4 inch by 6 inch prints. It would be preferred that the scanner produce higher resolutions, such as 2000×3000 pixels. The higher resolution scan is preferred so that "panoramic" images can be printed with at least 1000 pixels on the short picture axis without interpolation. The higher resolution is also preferred for the preparation of 5 inch by 7 inch (5R) prints. All magnifications higher than SR should be produced with 2000×3000 pixel scans.

Figure 3A:
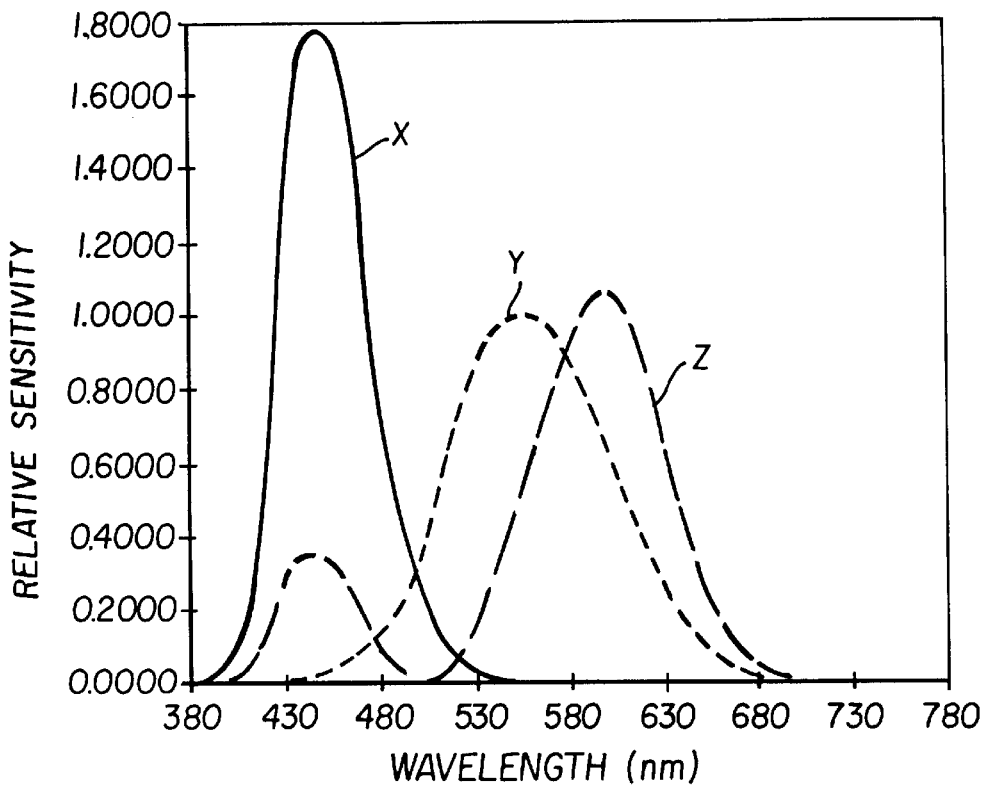
FIGS. 3A and 3B are graphical views useful in illustrating the present invention.
Figure 3B:
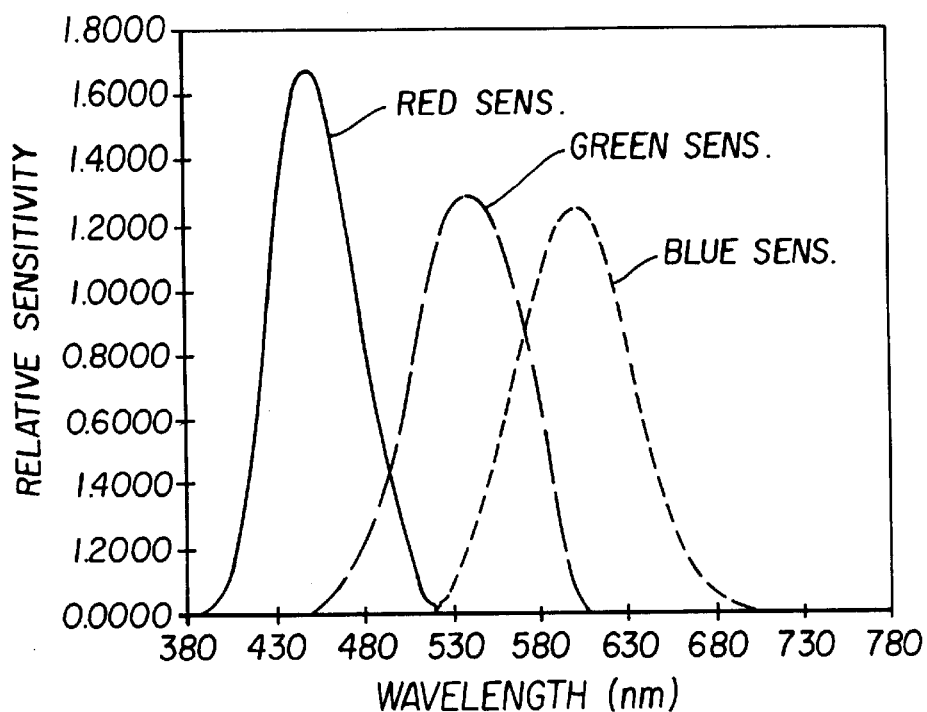

Ideally, the scanner should deliver the digitized data to the image processing algorithm as colorimetric tristimulus values. A scanner that measures colorimetric tristimulus values has effective spectral responses that match, or nearly match a set of human visual color matching functions. See FIGS. 3A and 3B for a set of color matching function sensitivities and a second set that nearly matches, that can be transformed to the first set using a simple linear model. A scanner having these types of spectral responses will yield scan densities that are much easier to modify than others because of the reduced number of transforms, and the degree of transformation required to produce visual colorimetric tristimulus values. These types of sensitivities are also capable of scanning all type of transparency films without modification, that is, individual film types do not require specific image processing steps.

Even though the scanner is not considered part of the digital image processing path, some manipulations of the data may be required to deliver appropriate colorimetric tristimulus values to the processing algorithm. Two key steps are: first, converting scanner densities to calibrated scanner densities, and, second, converting the calibrated scanner densities to colorimetric tristimulus values. Either matrix operations or look up tables can be used to perform these conversions.

Figure 2:
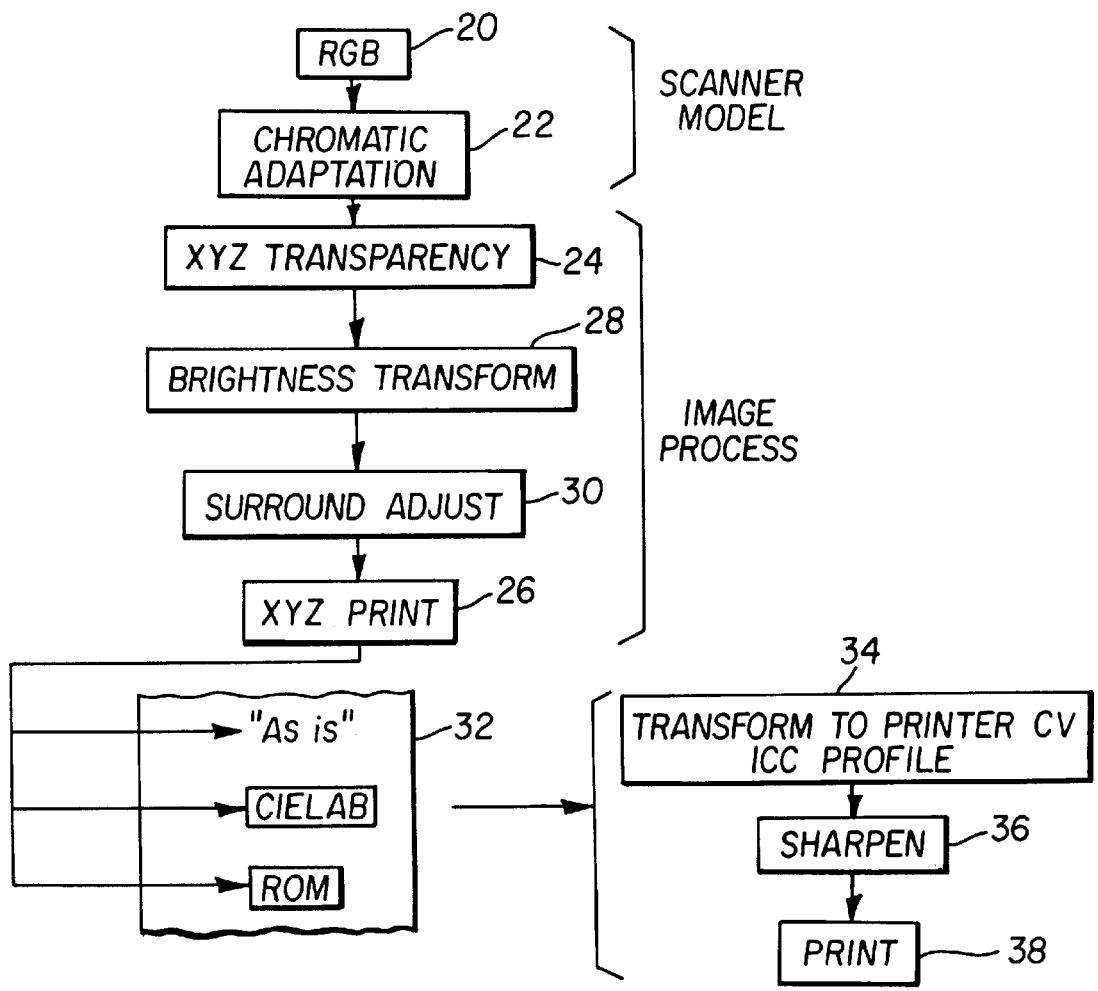
FIG. 2 is a flow diagram of the method of the present invention.

As shown in FIG. 2, the first step (box 20) in the process is to convert the raw scanner numbers to calibrated scanner densities. An appropriate matrix correction model is shown below.

$$\begin{vmatrix} D_{sr} \\ D_{sg} \\ D_{sb} \end{vmatrix} = \begin{vmatrix} a_{11} & a_{12} & a_{13} & a_{1c} \\ a_{21} & a_{22} & a_{23} & a_{2c} \\ a_{31} & a_{32} & a_{33} & a_{3c} \end{vmatrix} * \begin{vmatrix} N_{rsr} \\ N_{rsg} \\ N_{rsb} \\ 1 \end{vmatrix} \quad \text{(Eq. 1)}$$

In this equation, $\overline{N}_{rsx}$ is raw scanner number and $\overline{D}_{sx}$ is corrected scanner density.

The next process (box 22) in the scanner converts calibrated scanner densities to calibrated colorimetric densities. The process is implemented again with a matrix model that in this case can be up to a 3×10 matrix multiplication. An example of a 3×10 matrix model is shown below.

$$\begin{vmatrix} D_{pr} \\ D_{pg} \\ D_{pb} \end{vmatrix} = \begin{vmatrix} a_{11} & a_{12} & a_{13} & a_{14} & a_{15} & a_{16} & a_{17} & a_{18} & a_{19} & a_{1c} \\ a_{21} & a_{22} & a_{23} & a_{24} & a_{25} & a_{26} & a_{27} & a_{28} & a_{29} & a_{2c} \\ a_{31} & a_{32} & a_{33} & a_{34} & a_{35} & a_{36} & a_{37} & a_{38} & a_{39} & a_{3c} \end{vmatrix} * \begin{vmatrix} D_{sr} \\ D_{sg} \\ D_{sb} \\ D_{sr} * D_{sr} \\ D_{sg} * D_{sg} \\ D_{sb} * D_{sb} \\ D_{sr} * D_{sg} \\ D_{sr} * D_{sb} \\ D_{sr} * D_{sb} \\ 1 \end{vmatrix} \quad \text{(Eq. 2)}$$

The output of the matrix multiplication is calibrated colorimetric density. $\overline{D}_{sx}$ is calibrated scanner density and $\overline{D}_{px}$ is calibrated colorimetric density. The final step (box 24) is to convert the colorimetric densities to colorimetric tristimulus values by an antilogging process.

Another option for the conversion of the raw scanner densities to colorimetric tristimulus values is to combine all of the steps mentioned above into a sequence of 1D LUT, 3D LUT, 1D LUT, or in the simplest case, a single 3-D look-up table. A single 3D LUT is the preferred path to colorimetric tristimulus values producing the smallest root-mean square error.

Digital Image Processing Algorithm: Transparency to Print

This section describes a process for converting the reversal transparency colorimetric tristimulus values to those for a reflection print. The process assumes that the scanner produces tristimulus values, or near tristimulus values that can be transformed to tristimulus values by a simple linear matrix operation. These tristimulus values represent the colorimetric values of the transparency balanced to a D5000 white point. These values are then transformed from the transparency tristimulus values to those for a reflection print, at the same white point, using the algorithm described below. Three options exist at this point; these are a) use the values as is, b) convert these values to CIELAB values (see equations 8 and 9), or c) convert to ROMM values (see equations 10 and 11) according to the publication "Reference Output Medium Metric RGB Color Space (ROMM RGB) White Paper," of the Eastman Kodak Company. The selection of the appropriate metric is based on algorithm requirements for subsequent processes, and the printer output profile selected by the user.

Algorithm

The series of steps involved in the scan of transparencies to produce the appropriate output images is shown in FIG. 2. The key feature of this process is to convert the transparency media color (box 24) tristimulus values, that are appropriate values for slide viewing in a darkened room, to those for print viewing (box 26). The two transforms are the brightness transform (box 28) and the surround transform (box 30). The brightness transform is a simple scaling of the tristimulus values. Later, we will describe a look up table process for this step that avoids high-light clipping problems.

The next step is a surround transform that adjusts the final print contrast. The equations for the surround transform, both a linear and log form, are shown below. The γ value in the equation is selected to produce prints having a pleasing contrast to the observer.

$$X'=X*Y^\gamma/Y$$

$$Y'=Y^\gamma$$

$$Z'=Z*Y^\gamma/Y \qquad \text{(Eq. 3)}$$

where X, Y and Z are the colorimetric tristimulus values determined by the scanner.

If the negative log of the linear tristimulus values are determined, the equations in terms of chromatic densities ($X_d$, $Y_d$ and $Z_d$) become:

$$X'_d = X_d + (\gamma-1)*Y_d$$

$$Y'_d = \gamma * Y_d$$

$$Z'_d = Z_d + (\gamma-1)*Y_d \qquad \text{(Eq. 4)}$$

The chromatic densities are converted to linear values after the matrix adjustment. At this point in the process, the transformed tristimulus values are those for a reflection print viewed under a D5000 (color temperature) illuminant.

Alternatively, where there is a requirement to implement this as a 1D LUT, a simpler form of the (linear) surround transform can be used:

$$X'=X^\gamma$$

$$Y'=Y^\gamma$$

$$Z'=Z^\gamma \qquad \text{(Eq. 5)}$$

The X, Y and Z values are the scanner measure tristimulus values and γ value is an empirically determined value between 1 and 1.5.

The color and tonescale of prints prepared using equation (5) are very similar to the color and tonescale of prints prepared using equations (3) and (4), except that there is a very slight loss of color saturation. The scaling of the tristimulus values by scale factor a to implement the brightness transform can be incorporated into these equations, as follows:

$$X'=(\alpha X)^\gamma$$

$$Y'=(\alpha Y)^\gamma$$

$$Z'=(\alpha Z)^\gamma \qquad \text{(Eq. 6)}$$

where, typically, $1.0 \leq \alpha \leq 2.0$, and is selected to produce prints which have a pleasing overall density to the observer.

One further step that needs to be considered in the conversion of slide tristimulus values to the tristimulus values of a reflection print under D5000 illuminant is the compression of the dynamic range of the slide tonescale (FIG. 2 -box 32). It is required that the slide tonescale be compressed such that highlight and shadow detail may be adequately represented on the final print, without clipping, whilst maintaining mid-tone contrast, according to the selected value of γ. There are a variety of possible strategies by which this may be achieved, but one of the simplest is by means of highlight and lowlight shaper LUTs. The shaper LUTs are unity (1.0) for much of their range, but incorporate curvature in either the highlight or lowlight regions of the curve to compress the highlight or shadows, respectively, in the scene. In the case of the simple linear-form equations above, the shaper LUTs can be considered as a modifier on the scaling factor, α, in the highlight and lowlight portions of the tonescale, and can therefore be incorporated into the above equations so that brightness and surround transform and tone-scale compression can be combined and implemented in a single 1D LUT. More specifically, a highlight shaper LUT H, and a lowlight shaper LUT L which have been optimized for α=1 and γ=1 may be incorporated into the above equations as follows:

$$X'=(\alpha HLX)^\gamma$$

$$Y'=(\alpha HLY)^\gamma$$

$$Z'=(\alpha HLZ)^\gamma \qquad \text{(Eq. 7)}$$

The process implemented for making reflection prints is to convert the colorimetric tristimulus values to the appropriate CIELAB values using the standard equations and the tristimulus values of the D5000 illuminant reflected off of a 100% reflector. The CIELAB values can then be connected directly to an ICC profile for the selected output device. In simulations, a Kodak CRT Digital Color Printer II was operated with an ICC profile. The CIELAB transform equations are as follows.

$$L^* = 116\left[f\left(\frac{Y}{Y_n}\right) - \frac{16}{116}\right] \qquad \text{(Eq. 8)}$$

$$a^* = 500\left[f\left(\frac{X}{X_n}\right) - f\left(\frac{Y}{Y_n}\right)\right]$$

$$b^* = 500\left[f\left(\frac{Y}{Y_n}\right) - f\left(\frac{Z}{Z_n}\right)\right]$$

where $X_n$=0.9643, $Y_n$=1.0000, and $Z_n$=0.8250 are the tristimulus values of the D5000 reference white, and $$f(a) = \begin{cases} 7.787a + \frac{16}{116}; & a \leq 0.008856 \\ a^{\frac{1}{3}}; & a > 0.008856 \end{cases} \qquad \text{(Eq. 9)}$$

One further transformation is to convert the tristimulus values to ROM colorimetric values. The matrix for the color space rotation and the equation for the video gamma compression are included below for reference.

XYZ to ROMM RGB (12 bits)

$$\begin{bmatrix} R_{ROMM} \\ G_{ROMM} \\ B_{ROMM} \end{bmatrix} = \begin{bmatrix} 1.3460 & -0.2556 & -0.0511 \\ -0.5446 & 1.5082 & 0.0205 \\ 0.0000 & 0.0000 & 1.2123 \end{bmatrix} \begin{bmatrix} X_{PCS} \\ Y_{PCS} \\ Z_{PCS} \end{bmatrix} \qquad \text{(Eq. 10)}$$

Nonlinear Encoding of ROMM RGB $$X'_{ROMM} = \begin{cases} 0; & X_{ROMM} < 0.0 \\ 16 X_{ROMM} I_{max}; & 0.0 \leq X_{ROMM} < E_t \\ (X_{ROMM})^{\frac{1}{1.8}} I_{max}; & E_t \leq X_{ROMM} < 1.0 \\ I_{max}; & X_{ROMM} \geq 1.0 \end{cases} \quad \text{(Eq. 11)}$$

where X is either R, G, or B, $I_{max}$ is the maximum integer value used for the nonlinear encoding, and $$E_t = 16^{\frac{1.8}{(1-1.8)}} = 0.001953. \quad \text{(Eq. 12)}$$

These processes can be inverted to return ROMM RGB data to XYZ values. First the non-linear encoded ROMM values to linear ROMM RGB.

$$X_{ROMM} = \begin{cases} \dfrac{X'_{ROMM}}{16 I_{max}}; & 0.0 \leq X'_{ROMM} < 16 E_t I_{max} \\ \left(\dfrac{X'_{ROMM}}{I_{max}}\right)^{1.8}; & 16 E_t I_{max} \leq X'_{ROMM} \leq I_{max} \end{cases} \quad \text{(Eq. 13)}$$

In this equation, $X'_{ROMM}$ and $X_{ROMM}$ are the non-linear and linear ROMM RGB values, respectively, and X is either R, G, or B. The linear ROMM RGB values are then converted to tristimulus values with the following matrix equation.

$$\begin{bmatrix} X_{PCS} \\ Y_{PCS} \\ Z_{PCS} \end{bmatrix} = \begin{bmatrix} 0.7977 & 0.1352 & 0.0313 \\ 0.2880 & 0.7119 & 0.0001 \\ 0.0000 & 0.0000 & 0.8249 \end{bmatrix} \begin{bmatrix} R_{ROMM} \\ G_{ROMM} \\ B_{ROMM} \end{bmatrix} \quad \text{(Eq. 14)}$$

Image Quality Requirements

For color transparency films, the scanner is expected to measure the tristimulus values of the slide balanced to a D5000 white point. The slide tristimulus values are then transformed within the scanner to the appropriate non-linear encoded ROMM values for a reflection print viewed under a D5000 illuminant. The transformed image data is delivered to the image data manager for subsequent processing. It will be assumed that, within the scanner and prior to delivery to the image processing system, there will be appropriate calibration and correction matrix capability, if the spectral sensitivity of the scanner is not exactly the color matching function sensitivities as shown in figure x. For example, if the scanner achieves near color matching function sensitivities, i.e., sensitivities similar to those shown in the figure without the negative lobes, then a linear matrix will be provided to transform the measured values to actual tristimulus values as if the sensitivities were color matching functions. A simple 3×3 linear correction matrix will is sufficient to provide for this transformation.

Printer

As stated previously, the print rendered CIELAB values are transformed, by means of an ICC profile, to the appropriate printer code values for preparing the final print. Just prior to actually printing the image, a sharpening process is applied. The sharpening process is applied to correct for blurring effects from the scanner, printer, and any additional sharpening necessary to produce a most pleasing print appearance. An un-sharp masking algorithm is used for this purpose. The un-sharp masking equation is as follows.

$$D_c(x) = D(x) + \beta(D(x) - \int \phi(\xi) D(x-\xi) d\xi) \quad \text{(Eq. 15)}$$

In this equation $D_c(x)$ is the "sharpened" density at position x, $D(x)$ is the starting density at position x, and the integral values at each pixel position are computed by convolving the image with the kernel, below (Eq. 15). The recommended value of β is 2.5, a value that compensates for our prototype system, and produces the most pleasing prints for sharpness. Higher values produce artifacts that give the image an artificial appearance, or "oversharpened" appearance.

$$\frac{1}{324} * \begin{bmatrix} 0 & 1 & 5 & 1 & 0 \\ 1 & 21 & 38 & 21 & 1 \\ 5 & 38 & 60 & 38 & 5 \\ 1 & 21 & 38 & 21 & 1 \\ 0 & 1 & 5 & 1 & 0 \end{bmatrix} \quad \text{(Eq. 16)}$$

The red, green, and blue images are all sharpened to the same level.

At this stage in the process, the encoded data is sent to a printing device that renders, or prints, the information (box 38). A calibration process must be operating on this device such that the code values presented to the printer will yield the expected print densities. The resolution of printers used for the digital print path must operate at a minimum resolution of 250 dots per inch.

Printer Calibration

Evaluation of the printer will be done as part of the routine printer characterization process. A test print from a pre-processed image file will be printed, chemically processed, and measured using a reflection densitometer.

Printer calibration will be done as part of the image processing system maintenance such that test patch density differences between measured and expected densities of less than 0.01 are obtained. The process will only require a neutral scale calibration.

A series of uniform patches (at least 18) spanning the full range of printer code values are printed through an initial calibration LUT. This initial LUT must cover all those D/A count values that produce density on the print. The patch densities on the print are measured. With the initial LUT, the list of code values, respective densities of those patches, and the aim curve, a new calibration LUT can be calculated which should modify printing behavior according to the calibration aim.

The invention has been described in detail with particular reference to certain preferred embodiments thereof, but it will be understood that variations and modifications can be effected within the spirit and scope of the invention.

PARTS LIST 10 digital photofinishing system
12 scanner
14 digital image processing system
16 digital printer

What is claimed is:

1. A method of digital photofinishing comprising the steps of:

producing a digital color image having colorimetric tristimulus values describing a color transparency media from a color image captured on color transparency media;

first transforming said digital color image having colorimetric tristimulus values describing color transparency media to a digital color image having colorimetric tristimulus values describing a reflection print;

second transforming said digital color image having colorimetric tristimulus values describing a reflection print into digital code values representative of said color image for printing by a digital color printer using a combination of 1D and 3D look up tables;

sharpening said transformed digital code values representative of said color image with a sharpening algorithm optimized to avoid unacceptable artifacts; and digitally printing said sharpened digital color image onto reflection media.

2. The method of claim 1 wherein in said producing step, a digital color image is produced having colorimetric tristimulus values having effective spectral responses that match, or nearly match, a set of human visual color matching functions.

3. The method of claim 1 wherein said producing step includes:

scanning a color image captured on color transparency photographic media to produce an uncalibrated digital color image having uncalibrated scanner densities converting said uncalibrated digital color image to a calibrated digital color image having calibrated scanner densities using one of an appropriate matrix correction operation or look up tables;

converting said digital color image having calibrated scanner densities to a digital color image having calibrated colorimetric densities using a matrix mode; and converting said digital color image having calibrated colorimetric densities into a digital color image having colorimetric tristimulus values using an antilogging process.

4. The method of claim 1 wherein said producing step includes scanning a color image captured on color transparency photographic media to produce an uncalibrated color image signal having uncalibrated scanner densities; and using one or more 1D and/or 3D look up tables converting said digital color image having said uncalibrated scanner densities to said digital color image having colorimetric tristimulus values descriptive of a color transparency media.

5. The method of claim 1 wherein said first transforming step uses a brightness transform and a surround transform.

6. The method of claim 5 wherein said brightness transform uses a simple scaling of the colorimetric tristimulus values.

7. The method of claim 5 including using a tone-scale compression algorithm to compress the highlight and low-light regions of the color image.

* * * * *